United States Patent
Dean et al.

(10) Patent No.: US 7,368,704 B2
(45) Date of Patent: May 6, 2008

(54) SELF-CONTAINED FORK SENSOR HAVING A WIDE EFFECTIVE BEAM

(75) Inventors: Michael Dean, St. Paul, MN (US); Christopher Dales, Minneapolis, MN (US); Charles Dolezalek, Stacy, MN (US)

(73) Assignee: Banner Engineering Corporation, Minneapolis, MN (US)

( * ) Notice: Subject to any disclaimer, the term of this patent is extended or adjusted under 35 U.S.C. 154(b) by 49 days.

(21) Appl. No.: 11/224,900

(22) Filed: Sep. 13, 2005

(65) Prior Publication Data

US 2007/0057207 A1    Mar. 15, 2007

(51) Int. Cl.
    *H01J 5/16*      (2006.01)
    *G01V 9/04*      (2006.01)

(52) U.S. Cl. .................................. 250/221; 250/222.1
(58) Field of Classification Search ................ 250/221, 250/222.1
See application file for complete search history.

(56) References Cited

U.S. PATENT DOCUMENTS

| | | | | |
|---|---|---|---|---|
| 4,253,020 | A * | 2/1981 | Michel et al. | 250/222.1 |
| 4,649,270 | A * | 3/1987 | Goldenberg | 250/221 |
| 5,180,910 | A * | 1/1993 | Spratte et al. | 250/221 |
| 5,187,361 | A * | 2/1993 | Ishii | 250/222.1 |
| 5,793,037 | A * | 8/1998 | Guillot et al. | 250/239 |
| 6,903,327 | B1 * | 6/2005 | Appleyard | 250/221 |
| 7,034,284 | B2 * | 4/2006 | Torii | 250/239 |
| 7,176,444 | B2 * | 2/2007 | Bergbach | 250/221 |

\* cited by examiner

*Primary Examiner*—John R. Lee
(74) *Attorney, Agent, or Firm*—Merchant & Gould P.C.

(57) ABSTRACT

A system and method for providing a fork sensor including an emitter, a receiver, and at least one lens assembly wherein the width of the effective beam does not depend upon the size of the emitter or the receiver. One aspect of the present invention is a method for detecting or counting the number of objects interrupting the effective beam of the fork sensor. Another aspect of the present invention is a method for measuring the dimensions of objects using the fork sensor.

21 Claims, 11 Drawing Sheets

SELF-CONTAINED FORK SENSOR HAVING A WIDE EFFECTIVE BEAM

TECHNICAL FIELD

The present invention relates to photoelectric sensors, and more specifically to a self-contained photoelectric sensor having a wide effective beam.

BACKGROUND

Photoelectric sensors debuted as throughbeam devices composed of lights and reflectors. Over the years, these sensors have developed into a multitude of designs, each used for a variety of purposes. One of these designs is the self-contained throughbeam, sometimes called a fork sensor. This sensor style, typically configured in a block letter C-shape, sends an electromagnetic signal (e.g., a beam of visible light, a laser beam, etc.) across from one arm of the sensor to another. Self-contained fork sensors can be used for a variety of applications, such as in production lines. For example, the sensors can be used to detect the presence or absence of items passing through the beam along a conveyor.

Figure 1:
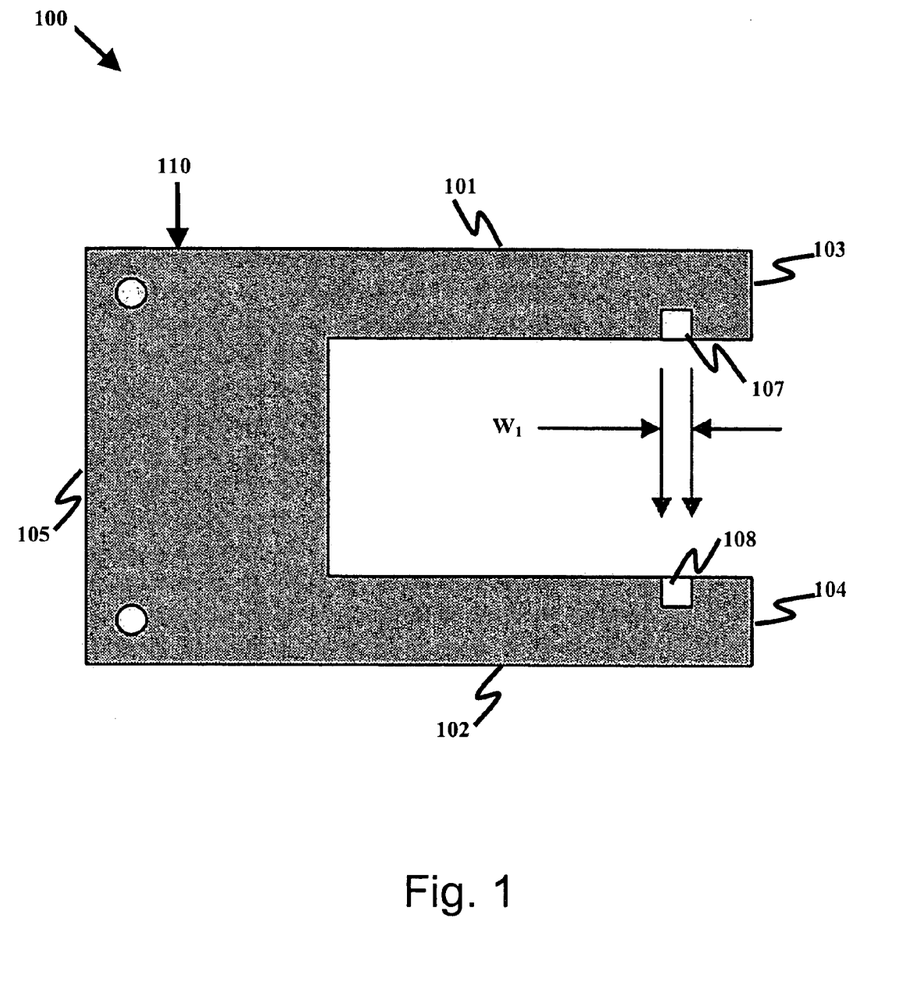
FIG. 1 illustrates a fork sensor as known in the art.

FIG. 1 illustrates a schematic of a fork sensor 100 currently used in industry. Housing 110 of the fork sensor 100 includes a first and second arm 101, 102 extending from a base 105. The first arm 101 includes an emitter 107 at a distal end 103. A second arm 102 includes a receiver 108 at a distal end 104. The emitter 107 is connected to a power source (not shown) and the receiver 108 is connected to a signal processing assembly (not shown). The emitter 107 is aligned with the receiver 108 such that a beam of light transmitted by the emitter 107 is received by the receiver 108 and converted into an electrical signal output. Placing a sufficiently opaque object between the emitter 107 and the receiver 108 interrupts a portion of the transmitted light before it reaches the receiver 108, thereby changing the signal output.

The beam of light has an effective width $W_1$, which is defined by the amount of light transmitted by the emitter 107 that is also received by the receiver 108. The magnitude of the effective width $W_1$ depends on the size of the emitter 107 and the receiver 108. Generally, both the emitter 107 and the receiver 108 are on the order of a couple millimeters wide. Therefore, the effective width $W_1$ of the beam is only on the order of a couple millimeters.

In order for an object to interrupt the beam as it passes between the emitter 107 and the receiver 108, at least a portion of the object must pass within those few millimeters. Therefore, movement of smaller objects through the fork sensor 100 must be accurately controlled.

SUMMARY

In general terms, the present invention is a system and method for providing a self-contained fork sensor having a wide effective beam.

One aspect of the present invention includes a method for providing a wide effective beam in a self-contained fork sensor. The method includes transmitting a first electromagnetic (EM) beam to a lens assembly, the first EM beam having a first width. The method further includes modifying the first EM beam to create a second EM beam substantially perpendicular to the first EM beam, the second EM beam having a width substantially wider than the first width. The method still further includes transmitting the second EM beam over a distance to the lens assembly, and modifying the second EM beam to create a third EM beam substantially perpendicular to the second EM beam. The second EM beam has a width substantially wider than the third EM beam.

In some embodiments, the lens assembly is a single lens assembly. In these embodiments, transmitting the second EM beam over a distance to the lens assembly includes transmitting the second EM beam to a reflective target and transmitting the second EM beam from the reflective target back to the lens assembly.

In some other embodiments, the lens assembly includes a first and second lens assembly, and transmitting the first EM beam to the lens assembly includes transmitting the first EM beam to the first lens assembly. Transmitting the second EM beam to the lens assembly includes transmitting the second EM beam to the second lens assembly.

In one example embodiment, a self-contained fork sensor includes an emitter, a lens assembly, a target, and a receiver. The lens assembly includes a first surface and a second surface. The first surface is configured to receive a first beam of light from the emitter and to transmit a final beam of light to the receiver. The second surface is configured to transmit a second beam of light to the target and to receive a third beam of light from the target. The second and third beams have widths substantially wider than the first and final beams. The receiver receives the final beam of light from the lens assembly and generates an output signal based on the final beam.

In another example embodiment, a self-contained fork sensor includes an emitter, a first lens assembly, a second lens assembly, and a receiver. The emitter generates a first beam of light to the first lens assembly. The first lens assembly receives the first beam of light and transmits a second beam of light to the second lens assembly. The second lens assembly receives the second beam of light and transmits a third beam of light to the receiver. The receiver receives the third beam of light and generates an output signal. The second beam of light has a width substantially greater than either the first or the third beam of light.

Embodiments of the present invention can be used to detect the presence of objects, to count objects in gravity based packaging, or to measure the dimensions of an object passing anywhere along the length of the lens assemblies.

One aspect of the present invention is a method for counting the number of objects passing between the effective beam of the fork sensor. The method includes taking a base reading of an output signal generated by the receiver. The method further includes calibrating the fork sensor and measuring the changes in the output signal resulting from objects interfering with the effective beam of the fork sensor.

Yet another aspect of the present invention is a method for measuring the dimensions of objects using a fork sensor. The method includes taking a base reading and then placing an object within the effective beam of the fork sensor so that the object blocks at least a portion of the light beam. The method further includes measuring the changes in the output signal generated by the receiver based on the changes in the amount of the light reaching the receiver.

In one embodiment of the present invention, a fork sensor includes lens assemblies which are unitary in construction. In another embodiment of the present invention, each lens assembly includes a first lens and a redirecting feature.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 2:
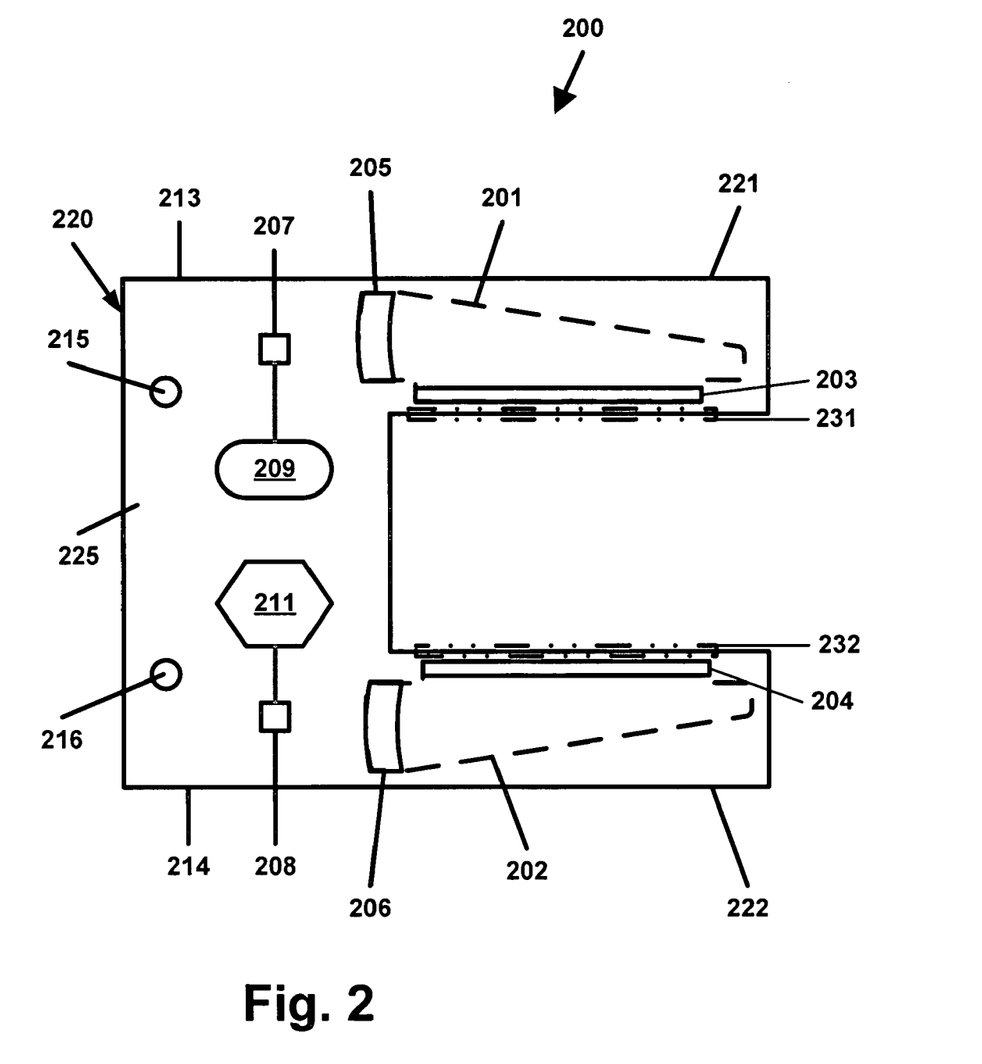
FIG. 2 illustrates a fork sensor according to one embodiment of the present disclosure.
Figure 3:
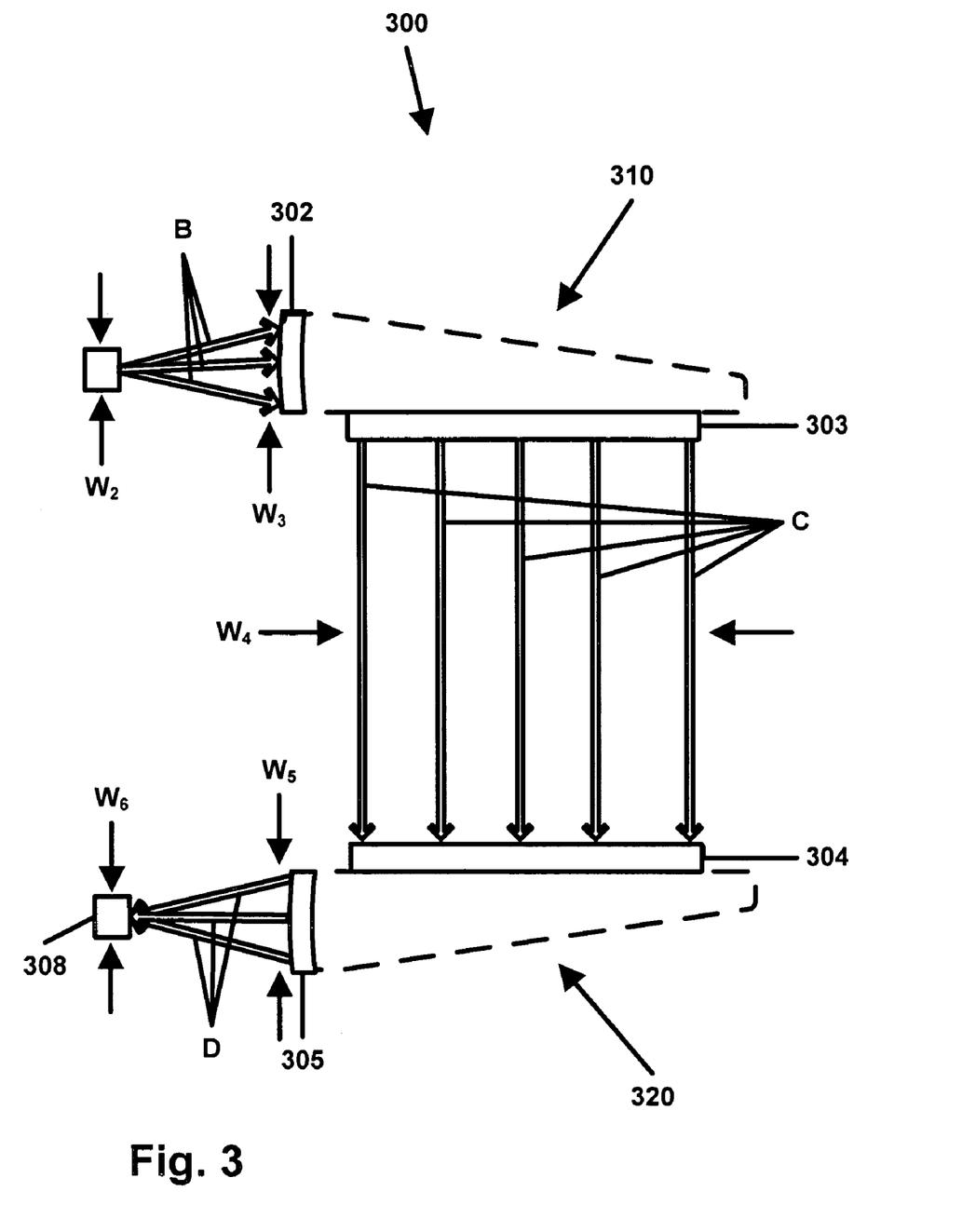
FIG. 3 illustrates a path and corresponding effective width of a light beam as it propagates through a fork sensor assembly according to one embodiment of the present disclosure.
Figure 4:
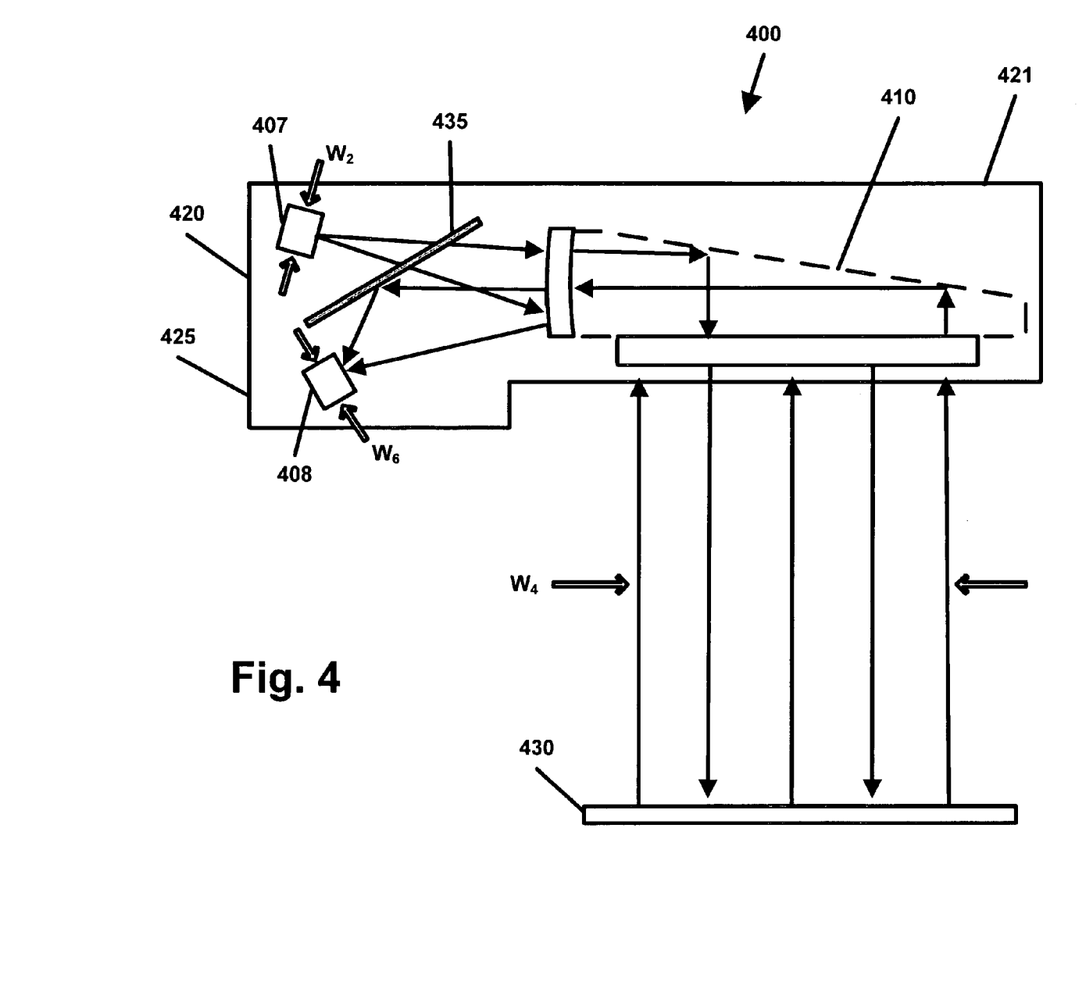
FIG. 4 illustrates an alternative embodiment of a fork sensor assembly.

Referring now to FIGS. 2-4, a wide beam fork sensor includes a light emitter, a light receiver, and at least one lens assembly extending substantially the length of one arm of the fork sensor. One end of each lens assembly is configured to transmit or receive a first beam having an effective beam width extending substantially along the length of the lens assembly. Another end of each lens assembly is configured to transmit or receive a second beam having an effective beam width extending substantially less than the effective beam width of the first beam.

Referring now to FIG. 2, in some embodiments, the light emitter and light receiver are oriented towards a first lens assembly extending along a first arm of the fork sensor and a second lens assembly extending along a second arm of the fork sensor, respectively. FIG. 2 illustrates a fork sensor 200 including a housing 220 having a first and second arm 221, 222 extending from a base 225. In some embodiments, the first and second arms 221, 222 extend intermediate 5 mm and 50 mm. However, the length of the first and second arms 221, 222 is limited only by the dimensions of the desired overall fork sensor 200. In some embodiments, the first and second arms 221, 222 are spaced intermediate 5 mm and 100 mm apart. However, the distance intermediate the first and second arms 221, 222 is also limited only by the dimensions of the desired overall fork sensor 200.

The base 225 includes an emitter 207 at one end 213 and a receiver 208 at another end 214. However, the embodiment is not limited by the location of the emitter 207 and receiver 208 and these components can be located in other areas of the fork sensor 200 without deviating from the spirit of the present disclosure.

In one embodiment, the emitter 207 is positioned and oriented to emit an EM (e.g., light) beam along the length of the first lens assembly 201. The frequency of the transmitted light is limited only by the ability of the receiver 208 to accurately sense the light. According to one embodiment, the emitter 207 is an LED that emits visible light. According to another embodiment, the emitter 207 emits infrared light. According to yet another embodiment, the emitter 207 generates ultraviolet light.

The receiver 208 is positioned and oriented to receive the transmitted light. In one embodiment, the receiver is a semiconductor photodiode. However, the embodiment is not limited to a photodiode and any suitable photosensor can be used.

In one embodiment, a power source 209 is also included within the base 225. The emitter 207 is electrically connected to the power source 209. According to another embodiment, the power source 209 is external to the housing 220 and is electrically connected to a power supply line (not shown) leading into the housing 220. In this embodiment, the power supply line is electrically coupled to the emitter 207. Examples of power sources include batteries, voltage generators, solar cells and the like.

In one embodiment, a signal processing assembly 211 is included within the base 225. According to this embodiment, the receiver 208 is electrically connected to the signal processing assembly 211. In another embodiment, the signal processing assembly 211 is external to the housing 220 and is electrically connected to a signal transmission line (not shown) leading out of the housing 220. In this embodiment, the signal transmission line is connected to the receiver 208.

In one embodiment, a first and second attachment hole 215, 216 are defined by the base 225. These holes 215, 216 enable the fork sensor 200 to be attached to a surface using fasteners such as screws, nails, pegs, or the like. However, the embodiment is not limited to these fasteners and any suitable fastener can be used, such as a bonding material or the like.

According to one embodiment of the fork sensor 200, the first arm 221 includes a first lens assembly 201 and the second arm 222 includes a second lens assembly 202. When power is supplied to the emitter 207 from the power source 209, the emitter 207 emits a photon beam towards the first lens assembly 201. The first lens assembly 201 is arranged and configured to direct (e.g., or reflect, or refract) the light beam towards the second lens assembly 202. The second lens assembly 202 is arranged and configured to receive and focus the light beam onto the receiver 208. The receiver 208 transforms the received light beam into an electrical signal, which is then output to the signal processing assembly 211. The path followed by the light beam will be explained in more detail herein with respect to FIG. 3.

Still referring to FIG. 2, each lens assembly 201, 202 includes a first surface 203, 204 extending substantially along the length of the respective arms 221, 222. Each lens assembly 201, 202 further includes a second surface 205, 206 extending along the width of the respective arms 221, 222. The first lens surface 203, 204 of each lens assembly 201, 202 is substantially perpendicular to the respective second lens surface 205, 206. The first lens assembly 201 is configured so that light received at the second lens surface 205 of the first lens assembly 201 will be directed through the first lens surface 203 of the lens assembly 201 towards the second lens assembly 202. Example lens surface 203, 205 configurations include a flat surface and a curved surface. The second lens assembly 202 is configured so that light received at the first lens surface 204 will be directed through the second lens surface 206 and towards the receiver 208. Example lens surface 204, 206 configurations include a flat surface and a curved surface.

Each arm 221, 222 of the fork sensor 200 provides an open section, or window, 231, 232, respectively, through which the light propagating between the two arms 221, 222 enters and exits the housing 220. Each opening 231, 232 extends substantially along the length of the respective arm 221, 222. According to one embodiment, the openings 231, 232 include a slit provided by the housing 220. According to another embodiment, the openings 231, 232 include a piece of glass, plastic, or other such transparent material allowing light to pass through relatively unaffected. The open sections 231, 232 are generally defined by the planar lens surface 203, 204. However, the embodiment is not limited to the above dimensions and any suitable dimension can be used.

FIG. 3 illustrates a schematic depicting a sensor assembly according to one embodiment of the present disclosure. The sensor assembly 300 includes a first lens assembly 310 and a second lens assembly 320. The first lens assembly 310, which is depicted in dashed lines, includes a first lens 302 and a second lens 303. The second lens assembly 320, which is also depicted in dashed lines, includes a first lens 304 and a second lens 305. The sensor assembly 300 further includes an emitter 307 oriented towards the first lens 302 of the first lens assembly 310 and a receiver 308 oriented towards the second lens 305 of the second lens assembly 320.

The emitter 307 transmits a beam of light along a path B in the direction of the first lens assembly 310. The beam of light has a width $W_2$ upon leaving the emitter 307. The beam enters the first lens assembly 310 at the first lens 302. The beam has a beam width $W_3$ when it reaches the first lens 302. In one embodiment, the beam of light diverges before it reaches the first lens 302 of the first lens assembly 310. In this case, $W_3 > W_2$. In another embodiment, the beam of light does not diverge while traveling towards the first lens 302. In this case, $W_3 = W_2$. In yet another embodiment, the beam converges as it travels towards the first lens assembly 310 such that $W_3 < W_2$.

The light beam propagates through the first lens assembly 310 until it reaches the second lens 303. The beam exits from the second lens 303 of the first lens assembly 310 and is transmitted along a path C towards the second lens assembly 320. The path C extends between the first and second lens assemblies 310, 320. Generally, the length of the second lens 303 of the first lens assembly 310 defines the width $W_4$ of the transmitted light beam along a path C such that $W_4 > W_2$. In one possible embodiment, path C has a width $W_4$ of 33 millimeters. However, the invention is not limited to this width and any suitable width can be used.

Upon reaching the second lens assembly 320, the light beam passes through the first lens 304 and is directed towards the second lens 305. The light beam has a width $W_5$ as it passes through the second lens 305 and travels along a path D to the receiver 308. Generally, the width $W_5$ of the beam exiting the second lens assembly 320 is less than the width $W_4$ of the beam entering the assembly 320. Finally, the light beam is received at the receiver 308, which has a width $W_6$. The width $W_6$ of the receiver is generally less than the width $W_4$ of the path C between the first and second light assemblies 310, 320. In one embodiment, the width $W_6$ of the receiver 308 is on the same order as the width $W_2$ of the emitter 307. However, the invention is not limited to this width relationship and the receiver 308 can be any suitable width.

Referring now to FIG. 4, in some other embodiments, a fork sensor includes only one arm. FIG. 4 illustrates a retro-reflective fork sensor 400 including a housing 420 having an arm 421 extending from a base 425. The base 425 includes an emitter 407 having a width $W_2$ and a receiver 408 having a width $W_6$. The arm 421 includes at least one lens assembly 410. Each lens assembly 410 is arranged and configured to transmit light to a target 430, the light having an effective width $W_4$, which is substantially wider than the widths $W_2$, $W_6$ of the emitter and receiver 407, 408.

In some embodiments, the target 430 is external of the fork sensor housing 420. In other embodiments, the target 430 is contained within a second arm (e.g., as shown in FIG. 2, element 222) of the fork sensor housing 420. The target 430 is arranged and configured to reflect a substantial portion of the light received from the lens assembly 410 back to the lens assembly 410. Various example embodiments of the target 430 are formed from reflective prisms and spheres.

In some embodiments, the arm 421 includes only one lens assembly 410. The emitter 407 is oriented to transmit light to the lens assembly 410 and the receiver is oriented to receive light from the lens assembly 410. In these embodiments, the base 425 further includes a beam splitter 435 arranged and configured to transmit light received from the emitter 407 to the lens assembly 410, but to reflect light received from the lens assembly 410 to the receiver 408.

In some other embodiments, the arm 421 includes a first and second lens assembly 410a, 410b, respectively. The first and second lens assemblies 410a, 410b are arranged and configured to transmit and receive light without interfering with one another. In one example embodiment, the first lens assembly 410a is positioned on top of the second lens assembly 410b. In some embodiments, the base 425 includes an emitter 407 positioned and oriented to transmit light to the first lens assembly 410a and a receiver 408 positioned and oriented to receive light from the second lens assembly 410b. A beam of light travels from the emitter 408 to the first lens assembly 410a, which transmits the light to the target 430. The target 430 reflects the light to the second lens assembly 410b, which transmits the light to the receiver 408.

Similar to the fork sensor depicted in FIG. 2, some embodiments of the base 425 of the fork sensor 400 include a power source and a signal processing assembly (not shown). In other embodiments, the base 425 includes power supply lines and signal transmission lines (not shown). Generally, any suitable means may be used to power the emitter 407 or to analyze a signal generated by the receiver 408 without deviating from the spirit and scope of this disclosure.

Figure 5:
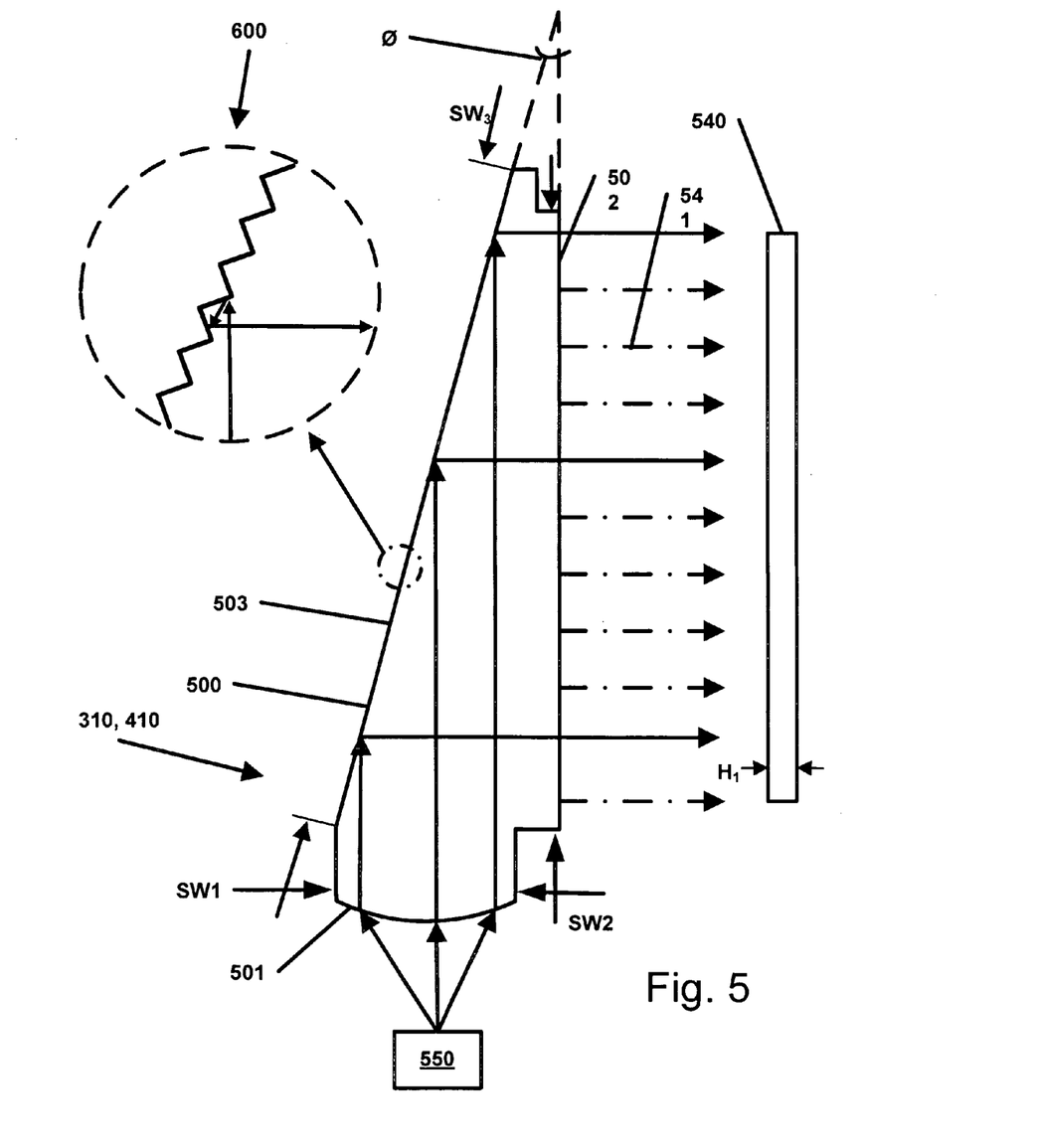
FIG. 5 illustrates a single-piece lens for use in a fork sensor according to one embodiment of the present invention.
Figure 6:
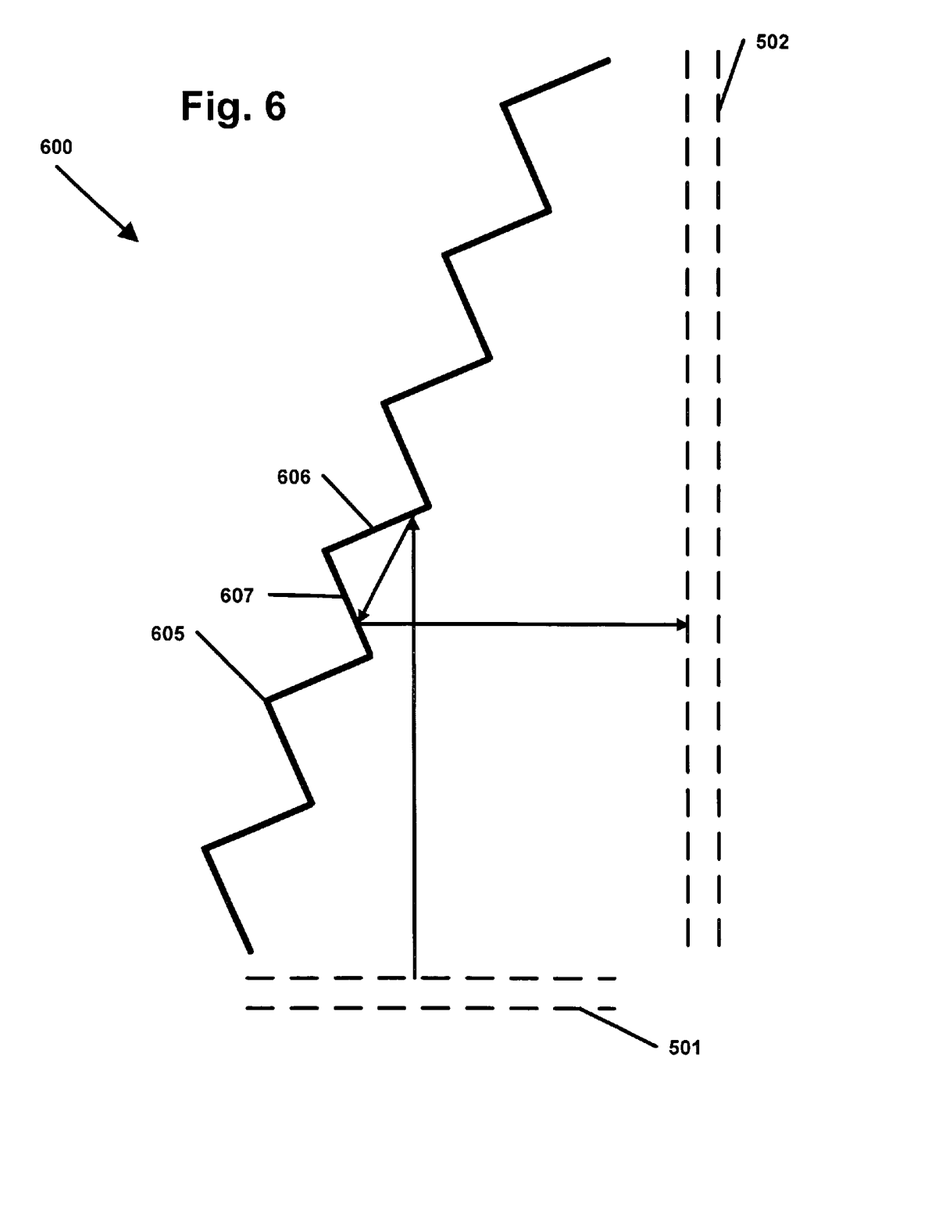
FIG. 6 illustrates a portion of the single-piece lens of FIG. 5.
Figure 7:
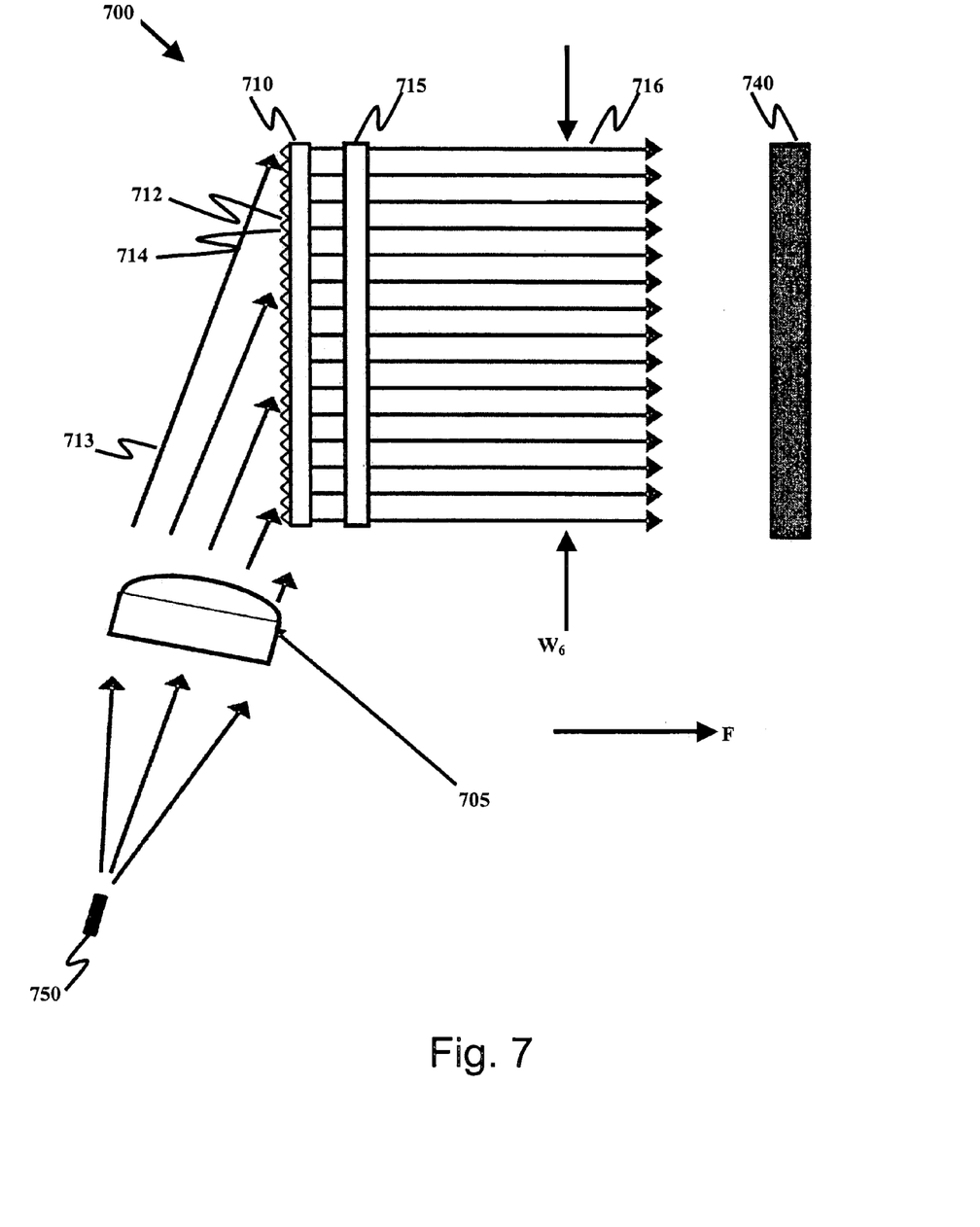
FIG. 7 illustrates a lens structure for use in a fork sensor according to another embodiment of the present invention.

FIGS. 5-7 illustrate different possible embodiments of the lens assemblies 310, 410. FIG. 5 illustrates one possible embodiment of a lens assembly 310, 410 that includes a single-piece lens 500. An emitter 550 emits a beam of light towards a single-piece lens 500. The single-piece lens 500 includes a first surface 501 through which light from the emitter 550 enters the single-piece lens 500, a second surface 502 through which the light exits the single-piece lens 500, and a third surface 503 for receiving the light from the first surface 501 and transmitting the light to the second surface 502. The first surface 501, the second surface 502, and the third surface 503 are all formed from a single piece of material. Generally, the first surface 501 is oriented substantially perpendicular to the second surface 502. However, the invention is not limited to this orientation and any suitable orientation may be used.

The first surface 501 is arranged and configured so that light generated by the emitter 550 will propagate in a generally straight line after passing through it. In one embodiment, the first surface 501 is convexly shaped to focus a diverging beam of light into a non-diverging beam. In another embodiment, the first surface 501 is flat, enabling a non-diverging beam of light to pass through unaltered. In yet another embodiment, the first surface 501 is concavely shaped to refract a converging beam of light into a straight, non-converging beam. Generally, the width $SW_1$ of the first surface 501 ranges between one and twenty millimeters. Typically, the width $SW_1$ of the first surface 501 is 10 millimeters. However, the embodiment is not limited to these dimensions and any suitable dimensions can be used.

The second surface 502 is arranged so that light 541 exiting through the surface 502 is shaped substantially like beam spot 540. Beam spot 440 illustrates one pattern of light; however, the invention is not limited to the pattern formed by beam spot 540, and any suitable pattern may be used, such as square, oval or the like. Generally, the height $H_1$ of the second surface 502 ranges from 1 mm to 5 mm as illustrated in the beam spot 540. In one embodiment, the width $SW_2$ of the second surface 502 is much greater than the width $SW_1$ of the first surface 501. In another embodiment, the width $SW_2$ of the second surface 502 is about the same as the width $SW_1$ of the first surface 501. Generally, the width $SW_2$ of the second surface 502 ranges between 10 and 50 millimeters. Typically, the width $SW_2$ of the second surface 502 is 33 millimeters.

The third surface 503 of the single-piece lens 500 is arranged to reflect light from the first surface 501 to the second surface 502. Generally, the width $SW_3$ of the third surface 503 ranges between 15 and 50 millimeters. Typically, the width $SW_3$ of the third surface is about 38 millimeters. However, the embodiment is not limited to these dimensions, and any suitable dimensions can be used. Generally, an area is formed by the first surface 501, second surface 502, and third surface 503, in which the second and third surfaces 502, 503 are defined by an angle Ø. Typically, the angle Ø between the second surface 502 and the third surface 503 ranges between 5° and 45°. In one possible embodiment, the angle Ø is about 15°. However, the embodiment is not limited to these dimensions and any suitable dimensions can be used.

According to one embodiment, the single-piece lens 500 is formed from an acrylic material. One example of such a material is Polymethyl methacrylate (PMMA). According to another embodiment, the single-piece lens 500 is formed from glass. According to yet another embodiment, the single-piece lens 500 is formed from plastic, fiberglass, plexi-glass, or the like. However, the invention is not limited to these materials and any suitable material can be used.

FIG. 6 illustrates one embodiment of a portion 600 of the third surface 503 of the single-piece lens 500 as illustrated in FIG. 5. The portion 600 of the reflective surface 503 includes a series of undulations (e.g., ridges) 605. The undulations 605 are arranged and configured to reflect a beam of light entering through the first surface 501 out towards the second surface 502. The undulations 605 are further arranged and configured to reflect towards the second surface 502 a beam of light having a larger width than the beam propagating from the first surface 501.

These undulations 605 are composed of a first surface 606 and second surface 607. In one embodiment, the first surface 606 and second surface 607 are flat and oriented generally perpendicular from each other. In another embodiment, the first and second flat surfaces 606, 607, are angled obliquely from each other. In yet another embodiment, the undulations 605 are composed of a series of Gaussian shaped waves (not shown) having first and second halves 606, 607. In still yet another embodiment, the undulations 605 are composed of first and second curved surfaces (not shown) angled either orthogonally or obliquely from one another.

In one embodiment, light rays entering through the first surface 501 propagate through the single-piece lens 500 and reach the first surface 606. Surface 606 is arranged and configured to reflect the light rays towards the second surface 607 of the undulation 605. Surface 607 is arranged and configured to reflect the light waves towards the second surface 502. Generally, each undulation surface 606, 607 ranges between 0.1 millimeter and 0.7 millimeter. Typically, each undulation 605 extends over a length of 0.25 millimeter. However, the invention is not limited to undulations of this size and any suitable undulation size may be used.

FIG. 7 illustrates one possible embodiment of a lens assembly 310, 410 that includes a lens structure 700. An emitter 750 emits a beam of light towards the lens structure 700. The lens structure 700 includes a first lens 705 and a redirecting feature 710. Light generated by the emitter 750 propagates to the first lens 705, which directs the light towards the path modification feature 710. The redirecting feature 710 bends (e.g., or redirects) the light so that it propagates in a non-diverging, wide beam along a direction F towards either a target (as illustrated in FIG. 4, element 430) or a second lens assembly (as illustrated in FIG. 3, element 320).

According to one embodiment, the first lens 705 is arranged and configured to modify (e.g., refract) diverging light from the emitter 750 into a non-diverging beam 713. According to another embodiment, the first lens 705 is arranged to modify converging light into a non-diverging beam. In yet another embodiment, the first lens 705 is arranged and configured to enable a non-diverging light beam to pass unaltered. In one embodiment, the first lens 705 is not connected to the redirecting feature 710. In another embodiment, the first lens 705 is connected to the redirecting feature 710.

In some embodiments, the redirecting feature 710 includes a series of peaks (e.g., ridges) 712. Each peak 712 has an angled surface 714 oriented towards the first lens 705. In one embodiment, the first lens 705 is angled obliquely in relation to the redirecting feature 710. Light rays passing through the first lens 705 are directed towards the angled surface 714 of each peak 712. Upon reaching the angled surface 714, the light rays are refracted along a path in the direction F to form a beam 716 of light having a width $W_6$. The angled surface 714 is arranged so that light 716 is shaped substantially like beam spot 740. Beam spot 740 illustrates one pattern of light; however, the invention is not limited to the pattern formed by beam spot 740, and any suitable pattern may be used, such as square, oval or the like.

In one embodiment, the redirecting feature 710 further includes a dust shield 715 for keeping dust and other such particles off of the redirecting feature 710. Interference from dust or other such particles on the surface of the redirecting feature 710 can cause the light to bend at an undesired angle, which would cause the resulting beam to diverge or converge rather than propagate in a straight line. According to one embodiment, the dust shield 715 is spaced from the redirecting feature 710, but is still contained within the housing of the fork sensor (see, e.g., FIG. 2, element 220 and FIG. 4, element 420). According to another embodiment, the housing of the fork sensor defines the dust shield 715.

Figure 8A:
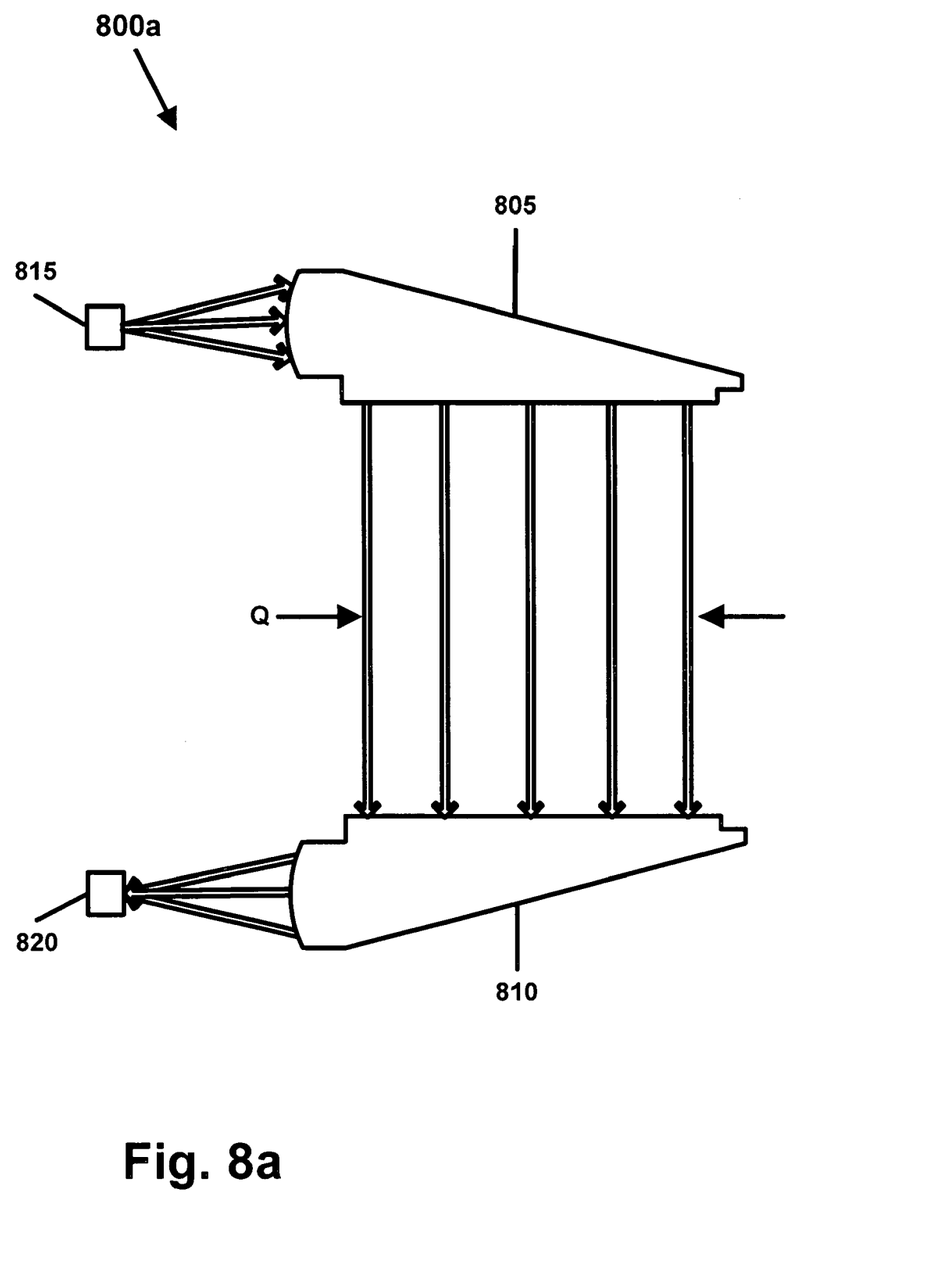
FIG. 8a illustrates the transmission of a light beam between a first lens assembly and a second lens assembly of a fork sensor according to another embodiment of the present invention.
Figure 8B:
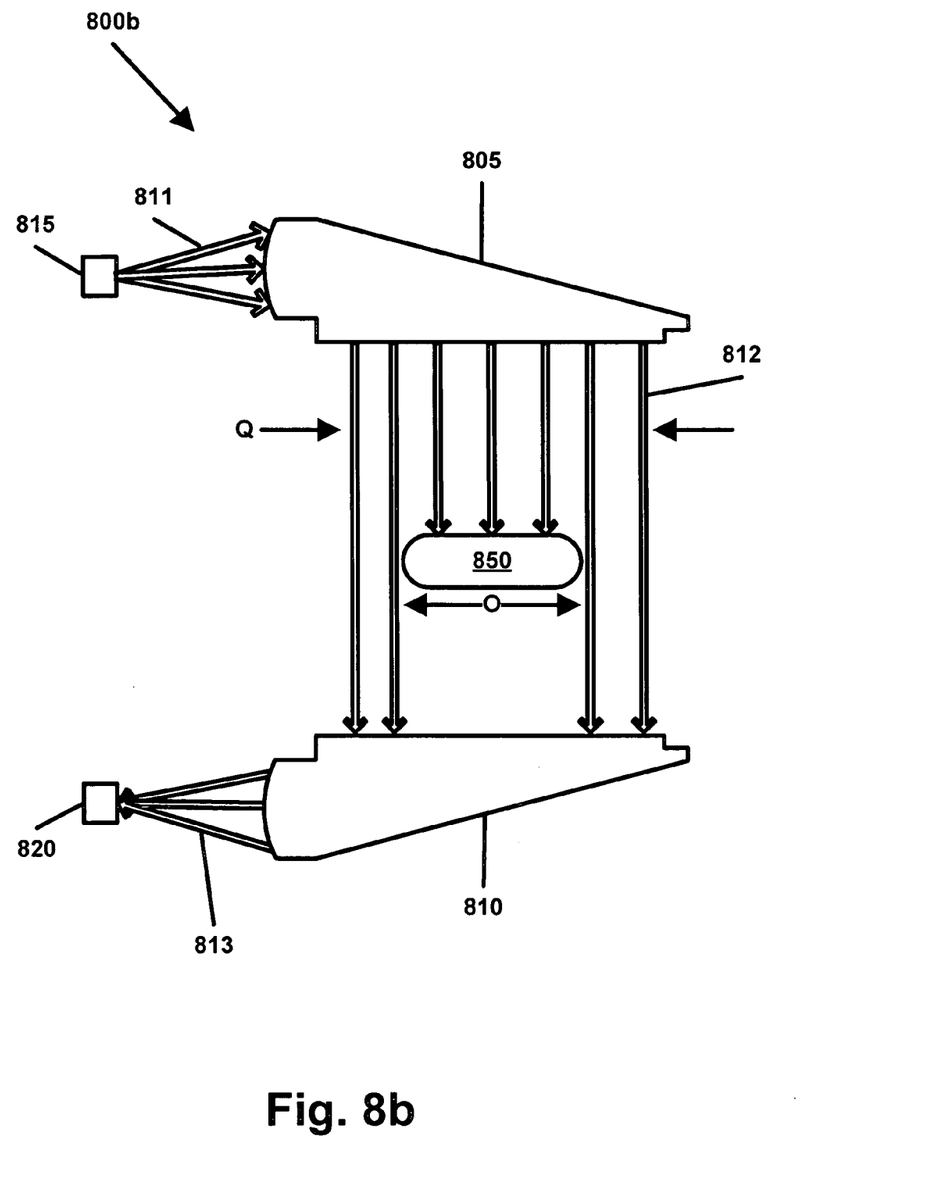
FIG. 8b illustrates the effect on the light beam transmission of FIG. 8a when an object is placed between the first and second lens assemblies.
Figure 9:
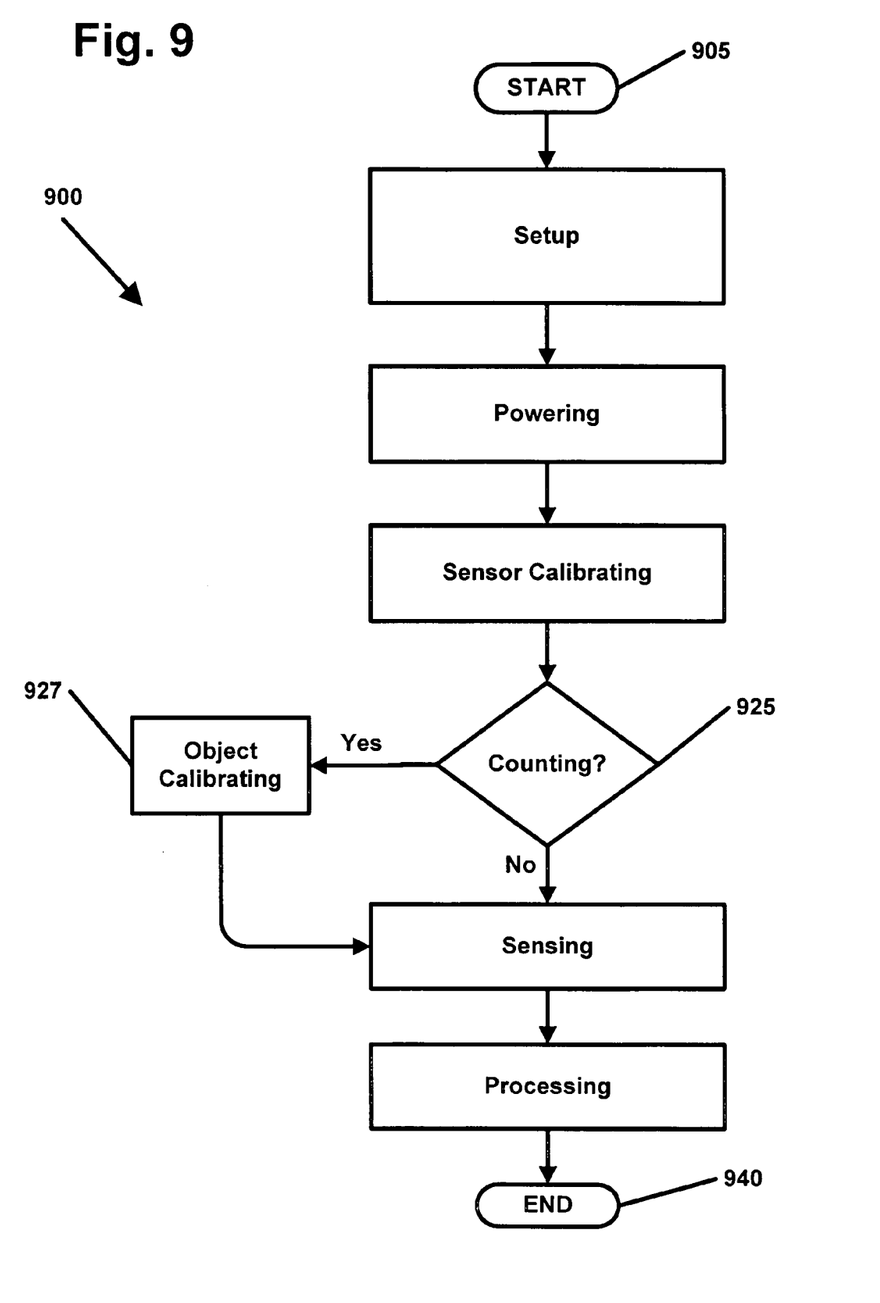
FIG. 9 is a flow chart illustrating an example operational flow for detecting objects using a wide beam fork sensor.
Figure 10:
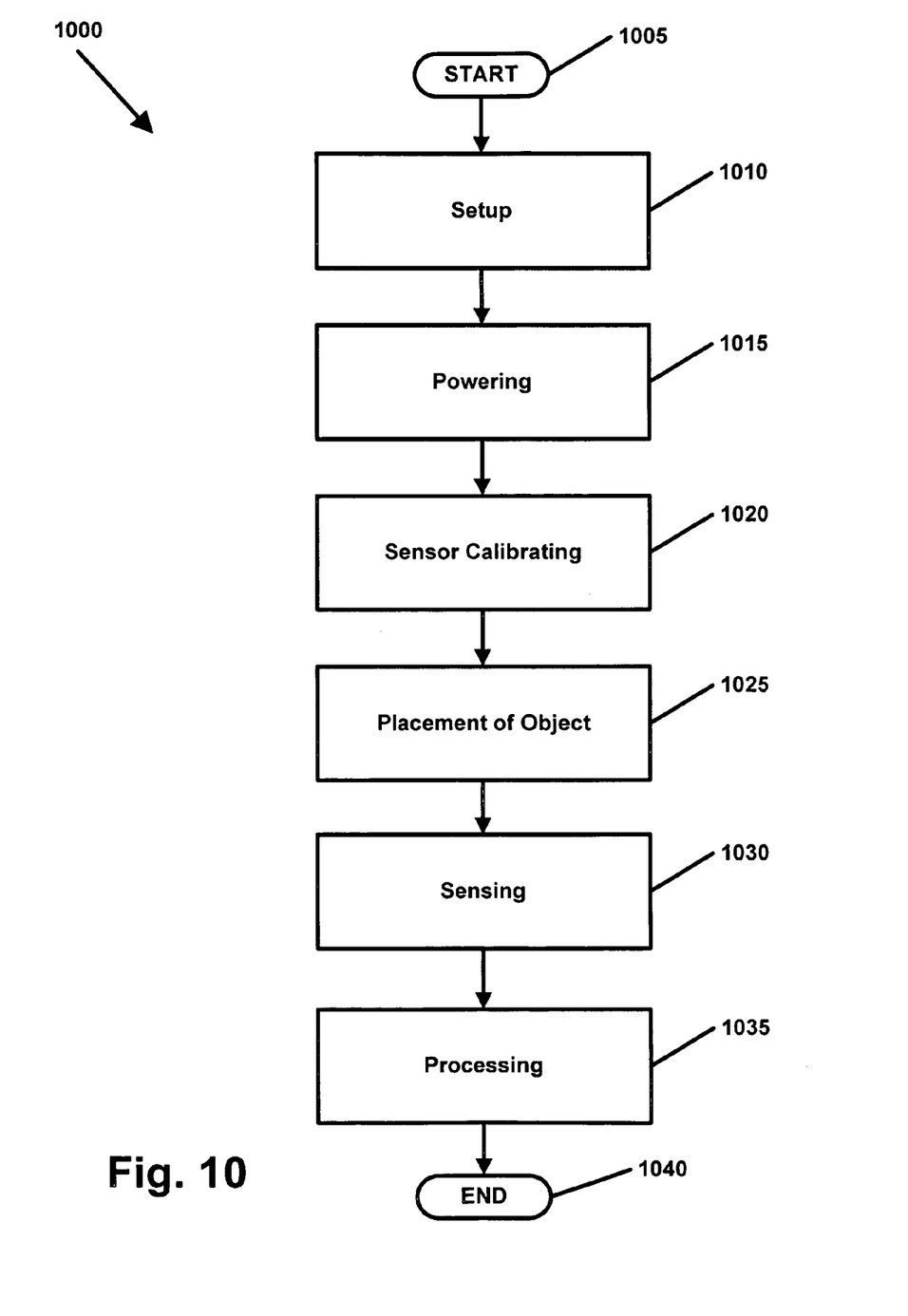
FIG. 10 is a flow chart illustrating an example operational flow for measuring the width of an object using a wide beam fork sensor.

Referring now to FIGS. 8-10, some example applications for a wide beam fork sensor are illustrated. FIGS. 8a and 8b illustrate embodiments of fork sensors 800a, 800b utilizing a wide effective beam to detect, count, and measure objects 850. FIG. 8a illustrates an unobstructed light beam traveling between a first lens assembly 805 and a second lens assembly 810 of the fork sensor 800a. In other embodiments, the fork sensors 800a, 800b are configured similar to fork sensor 400 depicted in FIG. 4 and have only one lens assembly 805. The lens assemblies 805, 810 have a beam width of Q. FIG. 8b illustrates the effect on the light beam when an object 850 having a width O, such that Q≧O, is placed between the first and second lens assemblies 805, 810.

Referring now to FIG. 9, embodiments of the fork sensor 800 are used in various industrial processes. In some embodiments, the fork sensor 800 is utilized to detect objects in a gravity-fed packaging process. In other embodiments, the fork sensor 800 is utilized to detect small parts ejected from a manufacturing process such as a metal stamping machine. In still some other embodiments, the fork sensor 800 is utilized to verify an assembly process such as sensing a cap on a small bottle. FIG. 9 illustrates a flow chart depicting an operation flow 900 for detecting objects 850 using a wide beam fork sensor 800. The process 900 will be described with reference to FIGS. 8a and 8b.

The process starts at module 905 and proceeds to setup operation 910. Setup operation 910 includes providing a fork sensor 800 having a first and second wide lens assembly 805, 810, an emitter 815, and a receiver 820. Power is supplied to the emitter 815 in powering operations 915. Supplying power causes the emitter 815 to transmit a beam of light in the direction of the first lens assembly 805. The beam of light is then transmitted from the first lens assembly 805 to the second lens assembly 810, which transmits the beam to the receiver 820. The receiver 820 is arranged to receive the beam and to convert the beam into an electrical signal output.

In a sensor calibration operation 920, a first reading measuring the signal output from the receiver 820 is taken. The first reading represents the amount of light received when the light from the emitter 815 reaches the receiver 820 without interruption or diversion. Module 925 changes the flow of operations 900 based on whether objects 850 are being counted or merely detected. If objects 850 are being counted, then the sensor 800 is further calibrated in object calibrating operation 927. This operation will be discussed in greater detail herein. If objects 850 are merely being detected, then the process proceeds directly to sensing operation 930.

Sensing operation 930 includes dropping one or more objects 850 through the beam propagating between the first and second lens assemblies 805, 810 of the fork sensor 800. The objects pass through the beam extending between the first and second lens assemblies 805, 810. When one of the objects is located in the path of the beam, at least some of the light from the beam is blocked from reaching the second lens assembly 810. Blocking at least a portion of the light causes the signal output of the receiver 820 to decrease. This decrease is detected in processing operation 935. The process 900 ends at module 940.

If the process 900 had proceeded to object calibrating operation 927, then the fork sensor 800 would have been further calibrated to measure the change in signal output from the receiver 820 due to a single object 850 passing through the beam of light. This operation assumes that objects 850 of generally the same dimension will be passing through the beam at generally the same velocity. Once object calibrating operation 927 is completed, then the process proceeds to sensing operation 930. The quantity of object 850 passing through the beam can then be determined using methods known in the art in processing operation 935 from the information gathered in sensing operation 930.

Pills being packaged using a gravity-fed packaging process, machine parts being transported by a conveyer belt, and small parts being ejected from a manufacturing process, are examples of objects 850 that can be detected and counted. However, the invention is not limited to the detection of these objects, and any object capable of breaking the beam, or a portion thereof, can be detected.

Referring now to FIG. 10, embodiments of the fork sensor 800 can also be used to measure various objects 850. In one example embodiment, the fork sensor 800 measures the diameter of an extruded tube. In another example embodiment, the fork sensor 800 guides an edge of a web-based process, using analog or discrete outputs. FIG. 10 illustrates a flow chart depicting an operational flow 1000 for measuring objects 850 using a fork sensor 800 having a wide effective beam. The process 1000 will be discussed with reference to FIGS. 8a and 8b.

The process starts at module 1005 and proceeds to setup operation 1010. A fork sensor 800 having a first and second lens assembly 805, 810, an emitter 815, and a receiver 820 is provided in setup operation 1010. The emitter 815 is arranged to transmit a beam of light when supplied with power. The receiver 820 is arranged to receive the beam of light and to convert the beam into an electrical signal output. The first and second lens assemblies 805, 810 extend along a substantial portion of the fork sensor 800. At this stage, the area between the first and second lens assemblies 805, 810 is not obstructed by any objects 850.

Power is supplied to the emitter 815 in powering operation 1015. The power causes the emitter 815 to emit a beam of light 811 in the direction of the first lens assembly 805, which transmits the light towards the second lens assembly 810 such that the beam passing between the assemblies 805, 810 has a width Q. The second lens assembly 810 transmits the light 813 towards the receiver 820. Calibrating operation 1020 includes taking a first reading of the received signal output from the receiver 820. The first reading represents the signal received when the beam of light passes between the two lens assemblies 805, 810 without interruption or divergence.

An object 850 having a width O is placed in the path of the light beam between the two lens assemblies 805, 810 in placement operation 1025. Because the width Q of the light beam is greater than the width O of the object, only a portion of the light is blocked from reaching the second lens assembly 810. In sensing operation 1030, a second reading is taken of the received signal output from the receiver 820. The difference between the first signal output and the second signal output is calculated in processing operation 1035. This difference can be mathematically converted into a dimensional measurement using methods known in the art. The process 1000 ends at module 1040.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A self-contained fork sensor comprising:
   an emitter for generating a first beam of light;
   a first lens assembly coupled to the emitter to receive the first beam of light having a first width and to transmit a second beam of light having a second width and being substantially perpendicular to the first beam of light, the second width being substantially greater than the first width;

a second lens assembly arranged and configured to receive the second beam of light having the second width from the first lens assembly and to transmit a third beam of light having a third width and being substantially perpendicular to the second beam of light, wherein the second width is substantially greater than the third width; and a receiver to receive the third beam of light from the second lens assembly for generating an output signal.

2. The fork sensor of claim 1, further comprising:

a signal processor for receiving and processing the output signal generated by the receiver.

3. The fork sensor of claim 1, further comprising a housing including a first and second arm, the first arm containing the first lens assembly and the second arm containing the second lens assembly.

4. The fork sensor of claim 3, wherein the first lens assembly further includes a dust shield.

5. The fork sensor of claim 3, wherein a distance between the first and second arms ranges between 5 mm and 100 mm.

6. The fork sensor of claim 1, wherein the first lens assembly includes a one-piece lens.

7. The fork sensor of claim 1, wherein the first lens assembly includes a first lens and a redirecting feature.

8. The fork sensor of claim 1, wherein the beam emitted from the first lens assembly is between 5 mm and 50 mm wide.

9. The fork sensor of claim 8, wherein the beam emitter from the first lens assembly is 30 mm wide.

10. The fork sensor of claim 1, wherein the emitter is an LED.

11. The fork sensor of claim 1, wherein the receiver is a photo diode.

12. A method for providing a wide effective beam in a self-contained fork sensor, the method comprising:

transmitting a first electro-magnetic (EM) beam to a lens assembly, the first EM beam having a first width;

modifying the first EM beam to create a second EM beam substantially perpendicular to the first EM beam, the second EM beam having a width substantially wider than the first width;

transmitting the second EM beam over a distance to the lens assembly; and modifying the second EM beam to create a third EM beam substantially perpendicular to the second EM beam, the second EM beam having a width substantially wider than the third EM beam.

13. The method of claim 12, wherein the lens assembly includes a first and second lens assembly, wherein transmitting the first EM beam to the lens assembly includes transmitting the first EM beam to the first lens assembly, and wherein transmitting the second EM beam to the lens assembly includes transmitting the second EM beam to the second lens assembly.

14. The method of claim 12, wherein transmitting the second EM beam over a distance to the lens assembly includes transmitting the second EM beam to a reflective target and transmitting the second EM beam from the reflective target back to the lens assembly.

15. The method of claim 12, further comprising receiving the third EM beam at an EM receiver, wherein the EM receiver generates an output signal based on the received EM beam.

16. The method of claim 12, further comprising:

taking a base reading of the output signal generated by the receiver;

interrupting at least a portion of the second EM beam by placing at least one object between the first and second lens assembly; and measuring changes in the output signal generated by the receiver caused by an interruption of the second EM beam.

17. The method of claim 16, further comprising calibrating the output signal of the receiver by measuring a change in the output signal when a single object interrupts the second EM beam.

18. The method of claim 16, further comprising determining dimensions of the object based on the changes in the output signal of the receiver.

19. A self-contained fork sensor comprising:

an emitter for generating a first beam of light;

a lens assembly including a first surface and a second surface, the first surface configured to receive the first beam of light from the emitter and to transmit a final beam of light, the first and final beams having a first width, the second surface configured to transmit a second beam of light having a second width and to receive a third beam of light having a third width, the third width being substantially greater than the first width, the second width being substantially equal to the third width;

a target arranged and configured to receive the second beam of light having the second width from the lens assembly and to transmit the third beam of light having the third width to the lens assembly; and a receiver for receiving the final beam of light having the first width from the lens assembly, the receiver generating an output signal based on the final beam.

20. The fork sensor of claim 19, further comprising a beam splitter for transmitting the first beam of light from the emitter to the lens assembly and for reflecting the final beam of light from the lens assembly to the receiver.

21. The fork sensor of claim 19, wherein the lens assembly includes:

a first lens assembly for receiving the first beam of light from the emitter and transmitting the second beam of light to the target; and a second lens assembly for receiving the third beam of light from the target and transmitting the final beam of light to the receiver.

* * * * *